（12）United States Patent
Rosén

(10) Patent No.: US 11,060,738 B2
(45) Date of Patent: Jul. 13, 2021

(54) HEATING SYSTEM

(71) Applicant: E.ON Sverige AB, Malmö (SE)

(72) Inventor: Per Rosén, Lund (SE)

(73) Assignee: E.ON SVERIGE AB, Malmo (SE)

( * ) Notice: Subject to any disclaimer, the term of this patent is extended or adjusted under 35 U.S.C. 154(b) by 115 days.

(21) Appl. No.: 16/314,445

(22) PCT Filed: Jun. 29, 2017

(86) PCT No.: PCT/EP2017/066133
§ 371 (c)(1),
(2) Date: Dec. 31, 2018

(87) PCT Pub. No.: WO2018/007235
PCT Pub. Date: Jan. 11, 2018

(65) Prior Publication Data
US 2019/0154271 A1 May 23, 2019

(30) Foreign Application Priority Data

Jul. 7, 2016 (EP) ..................................... 16178387

(51) Int. Cl.
*F24D 5/12* (2006.01)
*F24D 3/18* (2006.01)
(Continued)

(52) U.S. Cl.
CPC ................. *F24D 5/12* (2013.01); *F24D 3/18* (2013.01); *F24D 10/00* (2013.01); *F24D 10/003* (2013.01);
(Continued)

(58) Field of Classification Search
CPC .... F24F 3/06; F24D 19/1072; F24D 11/0207; F24D 11/001; F24D 10/003; F24D 10/00;
(Continued)

(56) References Cited

U.S. PATENT DOCUMENTS

| 4,949,547 A | 8/1990 | Shimizu |
| 8,099,972 B2 | 1/2012 | Dupraz |

(Continued)

FOREIGN PATENT DOCUMENTS

| CH | 697 593 B1 | 12/2008 |
| DE | 10 2009 047908 A1 | 8/2011 |

(Continued)

OTHER PUBLICATIONS

Translation of JPH0445332A (Year: 1998).*
(Continued)

*Primary Examiner* — Marc E Norman
*Assistant Examiner* — Schyler S Sanks
(74) *Attorney, Agent, or Firm* — Xsensus LLP

(57) ABSTRACT

The invention refers to a heating system (100) comprising a district cooling grid (1) and a local heating system (200) configured to heat a building and/or to heat tap water for the building. The heating system has a feed conduit (5) for an incoming flow of cooling fluid having a first temperature, and a return conduit (8) for a return flow of cooling fluid having a second temperature, the second temperature being higher than the first temperature. The local heating system (200) comprises a heat pump (10) having an inlet (10a) connected to the return conduit (8) of the district cooling grid (1) and an outlet (10b) connected to the feed conduit (5) of the district cooling grid (1).

13 Claims, 2 Drawing Sheets

(51) Int. Cl.
  *F24D 10/00* (2006.01)
  *F24D 19/10* (2006.01)
  *F24F 3/06* (2006.01)
(52) U.S. Cl.
  CPC ............ *F24D 19/1072* (2013.01); *F24F 3/06* (2013.01); *Y02B 30/12* (2013.01); *Y02B 30/13* (2018.05); *Y02B 30/17* (2018.05); *Y02E 20/14* (2013.01)
(58) Field of Classification Search
  CPC .. F24D 3/18; F24D 5/12; Y02B 30/17; Y02B 30/12; Y02B 30/125
  See application file for complete search history.

(56) References Cited

U.S. PATENT DOCUMENTS

2012/0042674 A1* 2/2012 Takenaka .................. F24F 3/06
 62/180
2012/0279681 A1* 11/2012 Vaughan ............. F24D 19/1039
 165/62

FOREIGN PATENT DOCUMENTS

| | | |
|---|---|---|
| DE | 10 2014 005003 A1 | 10/2015 |
| EP | 0 150 671 A1 | 8/1985 |
| EP | 2 719 977 A2 | 4/2014 |
| GB | 2 522 025 A | 7/2015 |
| JP | 2762155 A | 6/1998 |
| JP | H0445332 A * | 6/1998 |
| KR | 10-2008-0093676 A | 10/2008 |
| WO | 95/20133 A1 | 7/1995 |
| WO | 2009/139699 A1 | 11/2009 |

OTHER PUBLICATIONS

International Search Report dated Sep. 20, 2017 for PCT/EP2017/066133 filed on Jun. 29, 2017, 10 pages.
Office Action dated Jul. 31, 2020 in Korean Patent Application No. 10-2020-7019422, 11 pages.

* cited by examiner

HEATING SYSTEM

CROSS-REFERENCE TO RELATED APPLICATIONS

This application is a National Stage Application based on PCT/EP2017/066133, filed on 29 Jun. 2017, and claims priority to European Patent Application No. 16178387.3, filed on 7 Jul. 2016, the entire contents of which being incorporated herein by reference.

FIELD OF THE INVENTION

The invention relates to a heating system in which a local heating system of a building interacts with a district cooling grid.

BACKGROUND OF THE INVENTION

Nearly all large developed cities in the world have at least two types of energy distribution grids incorporated in their infrastructures: one grid for providing heating and one grid for providing cooling. The grid for providing heating may e.g. be used for providing comfort and/or process heating, and/or hot tap water preparation. The grid for providing cooling may e.g. be used for providing comfort and/or process cooling.

A common grid for providing heating is a gas grid or an electrical grid providing comfort and/or process heating, and/or hot tap water preparation. An alternative grid for providing heating is a district heating grid. The district heating grid is used for providing heated heat transfer liquid, typically in the form of water, to buildings of the city. A centrally placed heating and pumping plant is used for heating and distributing the heated heat transfer liquid. The heated heat transfer liquid is delivered to the buildings via one or more feed conduits and is returned to the heating and pumping plant via one or more return conduits. Locally at a building, heat from the heated heat transfer liquid is extracted via a heat pump.

A common grid for providing cooling is the electrical grid. The electricity may e.g. be used for running refrigerators or freezers or for running air conditioners for providing comfort cooling. An alternative grid for providing cooling is a district cooling grid. The district cooling grid is used for providing cooled heat transfer liquid, typically in the form of water, to buildings of the city. A centrally placed cooling and pumping plant is used for cooling and distributing the thus cooled heat transfer liquid. The cooled heat transfer liquid is delivered to the buildings via one or more feed conduits and is returned to the cooling and pumping plant via one or more return conduits. Locally at a building, cold from the cooled heat transfer liquid is extracted via a heat pump.

The use of energy for heating and/or cooling is steadily increasing, influencing the environment negatively. By improving utilization of the energy distributed in the energy distribution grids, negative influences on the environment may be reduced. Hence, there is a need for improving utilization of the energy distributed in energy distribution grids. Provision of heating/cooling also requires huge investments when it comes to engineering projects and there is a constant strive to cut the costs. Hence, there is a need for improvements in how to provide sustainable solutions to heating and cooling of a city.

SUMMARY OF THE INVENTION

It is an object of the present invention to solve at least some of the problems mentioned above by better utilizing energy available in a district cooling grid.

According to a first aspect a heating system is provided. The heating system comprises a district cooling grid having a feed conduit for an incoming flow of cooling fluid having a first temperature in the range of 4-12° C., and a return conduit for a return flow of cooling fluid having a second temperature, the second temperature being higher than the first temperature, the second temperature being in the range of 10-18° C.; a local heating system of a building configured to heat the building and/or to heat tap water for the building, wherein the local heating system of the building comprises a heat pump having an inlet connected to the return conduit of the district cooling grid and an outlet connected to the feed conduit of the district cooling grid.

Accordingly, in the inventive heating system the heat of the cooling fluid that is transferred in the return conduit of the district cooling grid, and which heat in prior art is considered as waste energy, is used as input to the heat pump. The heat pump uses the waste heat in the cooling fluid to elevate the temperature of the heating fluid that is used in the local heating system to provide comfort heating to the building and/or for heating tap water. This offers the advantageous effect that the energy consumption and the dimensioned load of the heat pump may be reduced. Also, provision or access to a district heating grid may to some extent or in some circumstances be redundant. From a financial perspective this lowers the overall energy cost to operate the building, and also the overall investment in the building and its equipment. Hence, the invention provides an environmentally and financially sustainable solution to future engineering projects.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

According to a second aspect a method for controlling heat outtake from a district cooling grid is presented. The district cooling grid is used to satisfy comfort cooling demands. The district cooling grid comprises a feed conduit conducting an incoming flow of a cooling fluid in the form of water, anti-freezing liquids or mixtures thereof, the incoming flow of cooling fluid having a first temperature in the range of 4-12° C., a return conduit conducting a return flow of the cooling fluid, the return flow of cooling fluid having a second temperature, the second temperature being higher than the first temperature, the second temperature being in the range of 10-18° C.; a district cooling plant which cools incoming cooling fluid of the return conduit from the second temperature to the first temperature; and a plurality of consuming cooling devices each configured to consume cooling of cooling fluid entering the consuming cooling device and thereby heating the cooling fluid, the heated cooling fluid being returned to the return conduit, wherein the cooling fluid is circulated in the district cooling grid by means of a pressure difference between the feed conduit and the return conduit, wherein the pressure in the feed conduit is higher than the pressure in the return conduit, wherein the heat outtake is performed via a heat pump having an inlet connected to the return conduit of the district cooling grid and an outlet connected to the feed conduit of the district cooling grid. The method comprising: controlling a pump arranged in the inlet or in the outlet of the heat pump to regulate the flow of cooling fluid flowing through the heat pump.

The method may further comprise determining data pertaining to a temperature of the cooling fluid in the outlet of the heat pump, wherein the act of controlling the pump comprises controlling the pump based on the data pertaining to the temperature of the cooling fluid in the outlet of the heat pump.

The heat pump may be connected to a heat emitter. Is such case, the method may further comprise determining data pertaining to heating demands of the heat emitter, wherein the act of controlling the pump comprises controlling the pump based on the data pertaining to heating demands of the heat emitter.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

These and other aspects of the present invention will now be described in more detail, with reference to the appended drawings showing embodiments of the invention. The figures are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

Starting with FIG. 1 the general design of a district cooling grid interacting with a building having a local cooling system will be discussed.

Figure 1:
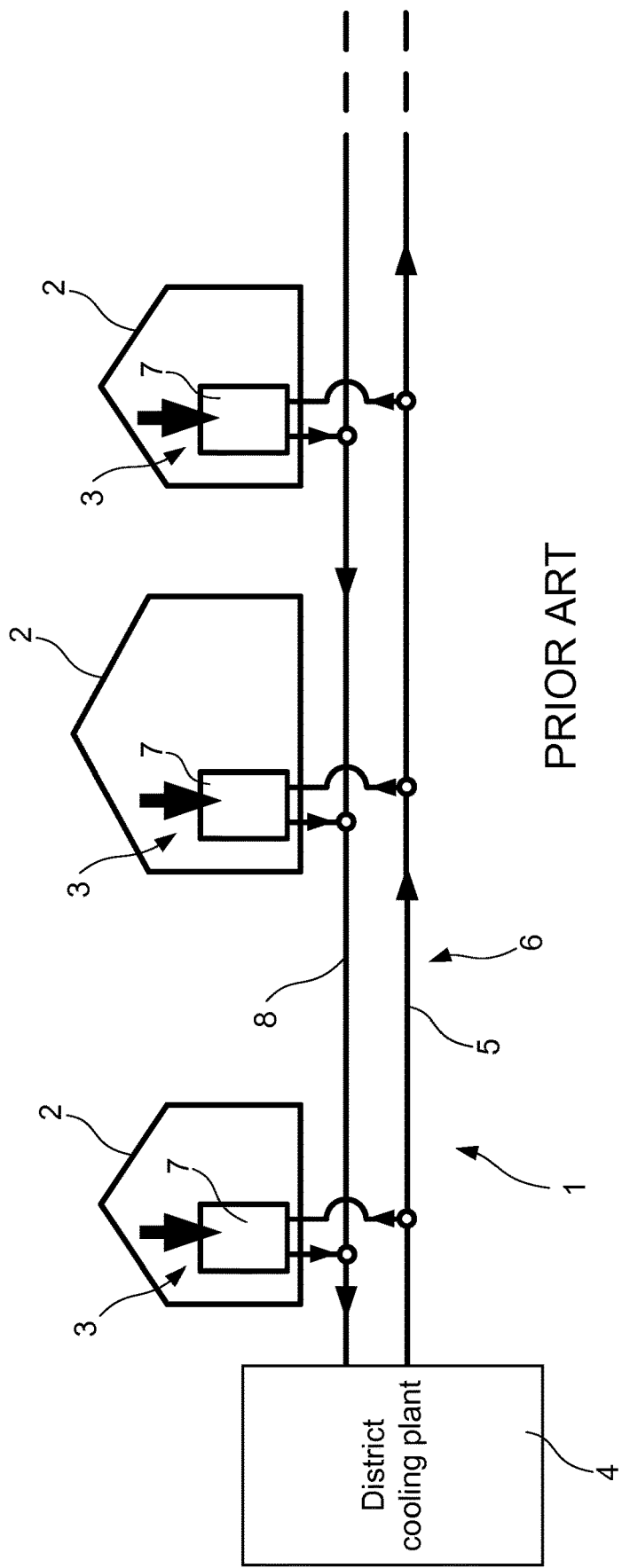
FIG. 1 is a schematic diagram of a prior art district cooling grid interacting with buildings, each having a local cooling system.

Starting with FIG. 1 a district cooling grid 1 as such is well known in the art and is formed by one or several hydraulic networks (not disclosed) that deliver a cooling fluid to local cooling systems 3 which are arranged in buildings 2 such as office buildings, business premises, residential homes and factories in need for cooling. A typical district cooling grid 1 comprises a district cooling plant 4 which cools the cooling fluid. The district cooling plant may by way of example be a power plant using lake water. The cooled cooling fluid is transported via a feed conduit 5 forming part of a conduit network 6 to locally distributed consuming cooling devices 7 which are arranged in the buildings 2. It goes without saying that one and the same building 2 may comprise several consuming cooling devices 7. Examples of consuming cooling devices 7 are air-conditioners and refrigerators.

When the cooling of the cooled cooling fluid is consumed in the consuming cooling devices 7 the temperature of the cooling fluid is raised and the thus heated cooling fluid is returned to the district cooling plant 4 via a return conduit 8 forming part of the conduit network 6.

District cooling grids 1 are used to satisfy comfort cooling demands. The temperature of the cooling fluid in the feed conduits 5 is typically between 4-12° C. The return temperature in the return conduits 8 is typically between 10-18° C.

The driving pressure difference between feed conduits and return conduits of the hydraulic network always creates a so called "pressure cone" whereby the pressure in the feed conduits 5 is higher than the pressure in the return conduits 8. This pressure difference circulates the cooling fluid in the hydraulic network between the district cooling plant and the cooling consumption devices.

The conduits used in a district cooling grid 1 are normally plastic un-insulated conduits designed for a maximum pressure of either 0.6 or 1 MPa and maximum temperature of about 50° C. Also, the cooling fluid and hence energy carrier is typically water, although it is to be understood that other fluids or mixture of fluids may be used. Some non-limiting examples are ammonia, anti-freezing liquids (such as glycol), oils and alcohols. A non-limiting example of a mixture is water with an anti-freezing agent, such as glycol, added thereto. The energy content of the returned cooling fluid is according to prior art considered as waste energy.

Figure 2:
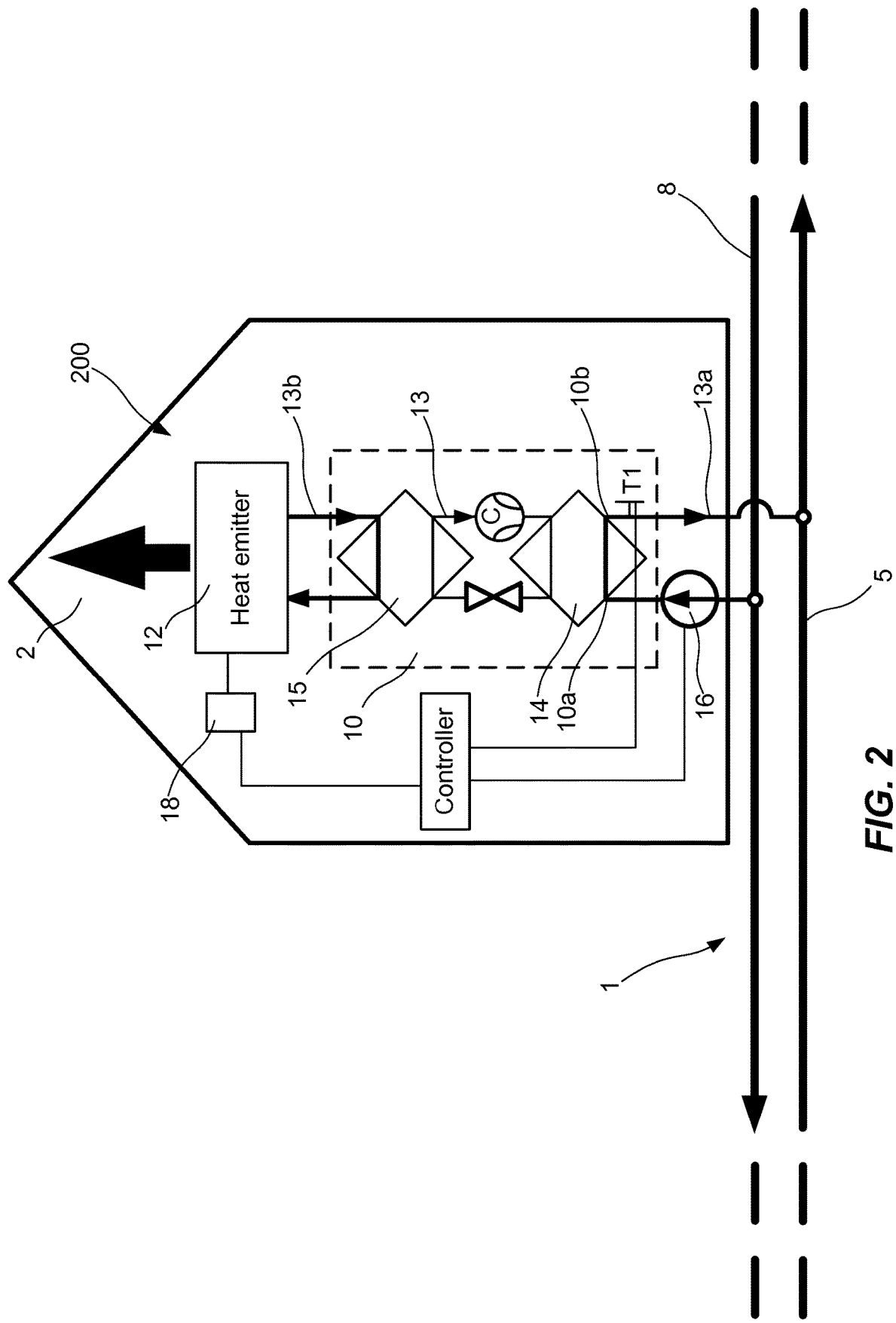
FIG. 2 is a schematic diagram of the inventive heating system.

Reference is now made to FIG. 2 which schematically discloses the inventive heating system 100. In its broadest sense the heating system 100 comprises a district cooling grid 1, a local heating system 200 of a building 2 and a heat pump 10. The district cooling grid 1 has the same design as previously described with reference to FIG. 1 and to avoid undue repetition, reference is made to the sections above describing the district cooling grid 1.

The local heating system 200 is a heating system using a circulating heating fluid such as water, although it is to be understood that other fluids or mixture of fluids may be used. Some non-limiting examples are ammonia, anti-freezing liquids (such as glycol), oils and alcohols. A non-limiting example of a mixture is water with an anti-freezing agent, such as glycol, added thereto. The local heating system comprises a heat emitter 12. Heat emitters 12 are as such well known in the art. The heat emitter 12 may be used e.g. for comfort heating buildings such as office buildings, business premises, residential homes and factories, and/or to heat tap water. Examples of typical heat emitters 12 are hydraulic radiator systems, hydraulic floor heating systems, air convectors with hydraulic heating coils and heating batteries with hydraulic heating coils arranged in ventilation systems supply air ducts. It goes without saying that one and the same building 2 may comprise several heat emitters 12.

The heat emitter 12 is connected to the district cooling grid 1 via a heat pump 10. A heat pump 10 as such is well known in the art. The heat pump 10 comprises a closed circuit 13 in which a brine is circulated between a first heat exchanger 14 and a second heat exchanger 15. The first heat exchanger 14 has an inlet 10a and an outlet 10b via which the heat pump 10 is connected to a first circuit 13a circulating a flow of a first fluid, in this case the cooling fluid of the district cooling grid 1. Likewise, the second heat exchanger 15 has an inlet and an outlet via which the heat pump 10 is connected to a second circuit 13b circulating a flow of a second fluid, in this case the heating fluid of the local heating system 200. During the circulation, a heat transfer takes place between the brine and the fluids circulating in the first and second circuits 13a, 13b, respectively.

In this context the term "inlet 10a of the heat pump" is to be interpreted as the inlet in the first circuit 13a via which the heat pump 10 is supplied with the cooling fluid of the district cooling grid 1. Likewise, the term "outlet 10b of the heat pump" is to be interpreted as the outlet in the first circuit 13a via which the heat pump 10 returns cooling fluid to the district cooling grid 1.

The local heating system 200 may further comprises a pump 16. The pump 16 is configured to overcome the pressure difference between the return conduits 8 and the feed conduit 5. The pump 16 is further configured to regulate the flow of cooling fluid flowing through the heat pump 10. By regulating the flow of cooling fluid trough the heat pump, and at the same time optionally control the operation of the heat pump, the temperature of the cooling fluid returned to the feed conduit 5 may be controlled. The pump 16 may be controlled by a controller 17. The controller 17 may control the pump 16 based on data pertaining to heating demands of the heat emitter 12 and/or data pertaining to the temperature of the cooling fluid in the outlet 10b of the heat pump 10. Data pertaining to heating demands of the heat emitter 12 may be determined by means of a heat demand sensor 18 connected to the heat emitter 12. Data pertaining to the temperature of the cooling fluid in the outlet 10b of the heat pump 10 may be determined by means of a temperature sensor T1 connected to the outlet 10b. In the in FIG. 2 shown embodiment the pump 16 is arranged in the inlet 10a of the heat pump 10. However, the pump 16 may alternatively be arranged in the outlet 10b of the heat pump 10.

The present invention resides in the surprising discovery to use the waste energy accessible in the return conduit 8 of the district cooling grid 1 as a heating source of a building 2, no matter if it is for comfort heating or heating tap water. More precisely, the inlet 10a of the heat pump 10 is connected to the return conduit 8 of the district cooling grid. Thereby the heat energy of the cooling fluid in the return conduit 8 which energy according to prior art is considered as waste energy is used as input to the heat pump 10. The cooling fluid in the return conduit 8 typically has a temperature in the range of 10-18° C.

The outlet 10b of the heat pump 10 is connected to the feed conduit 5 of the district cooling grid 1. Thereby, the cooling fluid delivered as output from the heat pump 10 is supplied to the feed conduit 5 of the local district cooling grid 1 where it intermixes with the flow of cooled cooling fluid. Depending on the settings of the heat pump 10, the temperature of the cooling fluid leaving the heat pump 10 is typically in the range of 4-12° C., i.e. in a range falling within the temperature of the cooling fluid in the feed conduit 5. The flow volume circulated via the heat pump 10 may be minor as compared to the flow volume through the feed conduit 5 whereby any temperature difference between the two flows may be overlooked in terms of heating of the cooling fluid in the feed conduit 5.

The invention provides an environmentally and financially sustainable solution to future engineering projects. The invention allows an existing infrastructure of a district cooling grid to be used not only for cooling but also for heating. In the inventive heating system, the heat energy that is accessible in the return conduit of the district cooling grid and which according to prior art is considered as waste energy is used as input to the heat pump forming part of a local heating system. The heat pump is thereby supplied with a pre-heated fluid whereby the energy consumption of the heat pump may be reduced. This lowers the overall energy cost to operate the building, and also the overall investment in the building. The reduced investment costs reside in the fact that the required designed capacity of the heat pump may be reduced. Likewise, the expected life length of the heat pump may be prolonged.

Variations to the disclosed embodiments can be understood and effected by the skilled person in practicing the claimed invention, from a study of the drawings, the disclosure, and the appended claims.

The invention claimed is:

1. A heating system comprising:
    a district cooling grid used to satisfy comfort cooling demands, the district cooling grid having:
        a feed conduit conducting an incoming flow of a cooling fluid in a form of water, anti-freezing liquids or mixtures thereof, the incoming flow of cooling fluid having a first temperature in the range of 4-12° C.,
        a return conduit conducting a return flow of the cooling fluid, the return flow of cooling fluid having a second temperature, the second temperature being higher than the first temperature, and the second temperature being in the range of 10-18° C.,
        a district cooling plant which cools the cooling fluid of the return conduit from the second temperature to the first temperature, and
        a plurality of consuming cooling devices each configured to consume cooling of the cooling fluid entering the consuming cooling device and to heat the cooling fluid, the heated cooling fluid being output to the return conduit, wherein
        the cooling fluid is circulated in the district cooling grid by means of a pressure difference between the feed conduit and the return conduit, and the pressure in the feed conduit is higher than the pressure in the return conduit; and
    a local heating system of a building configured to heat the building and/or to heat tap water for the building, wherein the local heating system of the building comprises:
        a heat pump having an inlet connected to the return conduit of the district cooling grid and an outlet connected to the feed conduit of the district cooling grid,
        a pump arranged in the inlet or in the outlet of the heat pump, and configured to overcome the pressure difference between the return conduit and the feed conduit,
        a temperature sensor configured to determine data pertaining to a temperature of the cooling fluid in the outlet of the heat pump, and
        a controller configured to control the pump to regulate the flow of cooling fluid flowing through the heat pump based on the data pertaining to the temperature of the cooling fluid in the outlet.

2. The heating system according to claim 1, wherein
    the local heating system of the building further comprises a heat emitter and a heat demand sensor configured to determine data pertaining to heating demands of the heat emitter, and
    the controller is configured to control the pump based on the data pertaining to heating demands of the heat emitter.

3. The heating system according to claim 1, wherein the controller is further configured to control operation of the heat pump.

4. The heating system according to claim 1, wherein the pump is arranged in the inlet of the heat pump.

5. The heating system according to claim 1, wherein the pump is arranged in the outlet of the heat pump.

6. The heating system according to claim 1, wherein the feed and return conduits are plastic un-insulated conduits.

7. A method for controlling heat outtake from a district cooling grid used to satisfy comfort cooling demands, the district cooling grid comprising a feed conduit conducting an incoming flow of a cooling fluid in a form of water, anti-freezing liquids or mixtures thereof, the incoming flow of cooling fluid having a first temperature in the range of 4-12° C., a return conduit conducting a return flow of the cooling fluid, the return flow of cooling fluid having a second temperature, the second temperature being higher than the first temperature, the second temperature being in the range of 10-18° C.; a district cooling plant which cools the cooling fluid of the return conduit from the second temperature to the first temperature; and a plurality of consuming cooling devices each configured to consume cooling of the cooling fluid entering the consuming cooling device and to heat the cooling fluid, the heated cooling fluid being outputted to the return conduit, wherein the cooling fluid is circulated in the district cooling grid by means of a pressure difference between the feed conduit and the return conduit, the pressure in the feed conduit is higher than the pressure in the return conduit, and the heat outtake is performed via a heat pump having an inlet connected to the return conduit of the district cooling grid and an outlet connected to the feed conduit of the district cooling grid, the method comprising:
  determining data pertaining to a temperature of the cooling fluid in the outlet of the heat pump; and
  controlling a pump arranged in the inlet or in the outlet of the heat pump to regulate the flow of cooling fluid flowing through the heat pump based on the data pertaining to the temperature of the cooling fluid in the outlet of the heat pump.

8. A method for controlling heat outtake from a district cooling grid used to satisfy comfort cooling demands, the district cooling grid comprising a feed conduit conducting an incoming flow of a cooling fluid in a form of water, anti-freezing liquids or mixtures thereof, the incoming flow of cooling fluid having a first temperature in the range of 4-12° C., a return conduit conducting a return flow of the cooling fluid, the return flow of cooling fluid having a second temperature, the second temperature being higher than the first temperature, the second temperature being in the range of 10-18° C.; a district cooling plant which cools the cooling fluid of the return conduit from the second temperature to the first temperature; and a plurality of consuming cooling devices each configured to consume cooling of the cooling fluid entering the consuming cooling device and to heat the cooling fluid, the heated cooling fluid being outputted to the return conduit, wherein the cooling fluid is circulated in the district cooling grid by means of a pressure difference between the feed conduit and the return conduit, the pressure in the feed conduit is higher than the pressure in the return conduit, and the heat outtake is performed via a heat pump having an inlet connected to the return conduit of the district cooling grid and an outlet connected to the feed conduit of the district cooling grid, wherein the heat pump is connected to a heat emitter, the method comprising:
  determining data pertaining to heating demands of the heat emitter, and
  controlling a pump arranged in the inlet or in the outlet of the heat pump to regulate the flow of cooling fluid flowing through the heat pump based on the data pertaining to heating demands of the heat emitter.

9. A heating system comprising:
  a district cooling grid used to satisfy comfort cooling demands, the district cooling grid having:
  a feed conduit conducting an incoming flow of a cooling fluid in a form of water, anti-freezing liquids or mixtures thereof, the incoming flow of cooling fluid having a first temperature in the range of 4-12° C.,
  a return conduit conducting a return flow of the cooling fluid, the return flow of cooling fluid having a second temperature, the second temperature being higher than the first temperature, and the second temperature being in the range of 10-18° C.,
  a district cooling plant which cools the cooling fluid of the return conduit from the second temperature to the first temperature, and
  a plurality of consuming cooling devices each configured to consume cooling of the cooling fluid entering the consuming cooling device and to heat the cooling fluid, the heated cooling fluid being output to the return conduit, wherein the cooling fluid is circulated in the district cooling grid by means of a pressure difference between the feed conduit and the return conduit, and the pressure in the feed conduit is higher than the pressure in the return conduit; and
  a local heating system of a building configured to heat the building and/or to heat tap water for the building, wherein the local heating system of the building comprises:
  a heat pump having an inlet connected to the return conduit of the district cooling grid and an outlet connected to the feed conduit of the district cooling grid,
  a pump arranged in the inlet or in the outlet of the heat pump, and configured to overcome the pressure difference between the return conduit and the feed conduit,
  a heat emitter and a heat demand sensor configured to determine data pertaining to heating demands of the heat emitter, and
  a controller configured to control the pump to regulate the flow of cooling fluid flowing through the heat pump based on the data pertaining to heating demands of the heat emitter.

10. The heating system according to claim 9, wherein the controller is further configured to control operation of the heat pump.

11. The heating system according to claim 9, wherein the pump is arranged in the inlet of the heat pump.

12. The heating system according to claim 9, wherein the pump is arranged in the outlet of the heat pump.

13. The heating system according to claim 9, wherein the feed and return conduits are plastic un-insulated conduits.

\* \* \* \* \*